United States Patent
Magnasco et al.

[11] Patent Number: 6,016,347
[45] Date of Patent: Jan. 18, 2000

[54] OPTICAL SWITCH FOR HEADSET

[75] Inventors: John Harry Magnasco, San Jose; Eric Maxon, Scotts Valley, both of Calif.

[73] Assignee: Hello Direct, Inc., San Jose, Calif.

[21] Appl. No.: 09/034,629

[22] Filed: Mar. 4, 1998

[51] Int. Cl.$^7$ .................................................. H04M 1/00
[52] U.S. Cl. ............................................................. 379/430
[58] Field of Search ........................... 379/430; 381/370, 381/375, 376, 383

[56] References Cited

U.S. PATENT DOCUMENTS

| | | | |
|---|---|---|---|
| 4,484,029 | 11/1984 | Kenney | 179/2 EA |
| 5,504,812 | 4/1996 | Vangarde | 379/430 |
| 5,694,467 | 12/1997 | Young, III | 379/430 |

OTHER PUBLICATIONS

Patent Abstracts of Japan, vol. 017, No. 412 (P–1583), Jul. 30, 1993 & JP 05 079855 A (Hitachi Ltd; Others: 01), Mar. 30, 1993.

Hello Direct "Catalog of Telephone Productivity Tools" Spring 1994, pp. 6–7, published in USA.

*Primary Examiner*—Jack Chiang
*Attorney, Agent, or Firm*—Haverstock & Owens LLP

[57] ABSTRACT

An optical switch for controlling an operative condition of a headset. The headset includes a microphone boom that is rotatable with respect to a housing for the headset. A rotator element is coupled to the microphone boom such that the rotator element rotates with respect the housing along with the microphone boom. Selected portions of a surface of the rotator element are conditioned to be more reflective than the remaining portions. Alternately, portions of the rotator element are opaque. A pair of optical transceivers are in fixed positions relative to the housing. When the microphone boom is positioned approximately straight upward with respect to a user's head, reflective portions of the rotator element are within a field of view of each optical transceiver of the pair. In this position, the headset is in an "off" or "standby" mode. When the microphone boom is positioned approximately level with the ground, a reflective portion of the rotator element is not within the field of view of the first optical transceiver, while a reflective portion is within the field of view of the second optical transceiver. In this, position, the headset is in an "mute" mode. When the microphone boom is pointing downward, a reflective portion in not in the field of view of either of the two optical transceivers. In this position, the headset is in a "talk" mode. The optical transceivers are less susceptible to wear, contamination and misalignment, and occupy less space than prior mechanical switch devices.

36 Claims, 7 Drawing Sheets

6,016,347

OPTICAL SWITCH FOR HEADSET

FIELD OF THE INVENTION

The invention relates to the field of corded and cordless telephone headsets. In particular, the invention relates to a telephone headset having a microphone boom wherein the headset is selectively configured to be on, off or muted according to a rotational position of the microphone boom.

BACKGROUND OF THE INVENTION

A telephone headset typically includes at least one speaker and a microphone. Certain headsets include a headband wherein the speaker is attached to the headband such that when the headband is placed upon the user's head, the speaker is disposed over one of the user's ears. If a second speaker is provided, it is attached to the headband such that the second speaker is disposed over the user's other ear. The microphone is typically positioned near or in front of the user's mouth at a first end of a microphone boom, the second end of the microphone boom being attached to the headband. Other headsets are secured to the user's head by means other than a headband, though such headsets typically include a microphone boom for positioning the microphone near the user's mouth. Telephone headsets can be corded or cordless.

It can be desirable for the user to control an operative condition of the headset. U.S. Pat. No. 4,484,029, and entitled, "Cordless Telephone Switch And Line Selector," discloses a cordless headset having a mouthpiece arm that is pivotable with respect to the headband. The mouthpiece arm is provided with a pivot means at an end opposite the mouthpiece such that rotation of the mouthpiece arm upward locates the mouthpiece, and microphone located therein, superiorly to the user's head and simultaneously disconnects power to the radio portion of the headset. This is accomplished by ganging the pivot means to a wiper-containing rotary switch. Lowering the mouthpiece arm such that the microphone is brought in line with the user's mouth rotates the switch wiper away from the "off" position and toward an "on" position, thus, connecting the microphone and powering the radio. Additional "on" positions are provided, each for a separate radio transmission channel.

The wiper and contacts of the aforementioned device may become misaligned, contaminated or worn, thus, reducing the reliability of the device.

A product, the HelloSet Cordless™ disclosed in Hello Direct, Inc.'s "Catalog of Telephone Productivity Tools," Spring 1994, discloses a headset having a single speaker and a rotatable microphone boom. Mechanical switches within the headset are responsive to the position of the microphone boom; the boom is positioned up for storage (off), down for use (on) and in the middle for mute.

The mechanical switches of the aforementioned product may also become misaligned or worn, thus, reducing the reliability of the device. Further, the mechanical switches tend to be relatively large in comparison to electrical components included in the aforementioned product. Therefore, what is needed is a technique for controlling an operative condition of a headset that does not suffer from the aforementioned drawbacks.

SUMMARY OF THE INVENTION

The invention includes an optical switch for controlling an operative condition of a headset. The headset includes a microphone boom that is rotatable with respect to a housing for the headset. A rotator element located within the housing is coupled to the microphone boom such that the rotator element rotates with respect the housing along with the microphone boom. The rotator element has a substantially planar surface including a circular portion and a tab extending from the circular portion. The rotator element rotates about an axis that is substantially perpendicular to its surface and approximately at the center of the circular portion. Selected portions of the surface of the rotator element are conditioned to be more reflective than the remaining portions. Particularly, the tab and a semi-circle of approximately one-half of the circular portion, as divided by a diameter which approximately bisects the tab, is conditioned to be more reflective than the remaining portions of the rotator element.

A pair of optical transceivers are fixed relative to the housing and positioned at predetermined distances from the rotational axis of the rotator element such that a first of the optical transceivers indicates whether or not the tab is positioned substantially within a field of view of the first optical transceiver according to a rotational position of the rotator element, and a second of the optical transceivers indicates whether or not the semi-circle is positioned substantially within a field of view of the second optical transmitter according to the rotational position of the rotator element.

When the microphone boom is positioned approximately straight upward with respect to a user's head as viewed from the side (e.g. approximately 12 noon), the first optical transceiver is substantially covered by the tab and the second optical transceiver is substantially covered by the semi-circle. In this position, the headset is in an "off" or "standby" mode. When the microphone boom is positioned approximately level with the ground as viewed from the side (e.g. between approximately 1 and 3 o'clock or between 9 and 11 o'clock), the first optical transceiver is not substantially covered by the tab or the semi-circle, while the second optical transceiver is substantially covered by the semi-circle. In this, position, the headset is in an "mute" mode. When the microphone boom is pointing downward as viewed from the side (e.g. between approximately 4 and 5 o'clock or between 7 and 8 o'clock), neither of the two optical transceivers is covered by the tab or the semi-circle. In this position, the headset is in a "talk" mode.

The optical transceivers are less susceptible to wear, contamination and misalignment and occupies less space than prior mechanical switch devices.

DETAILED DESCRIPTION OF THE PREFERRED EMBODIMENT

Figure 1:
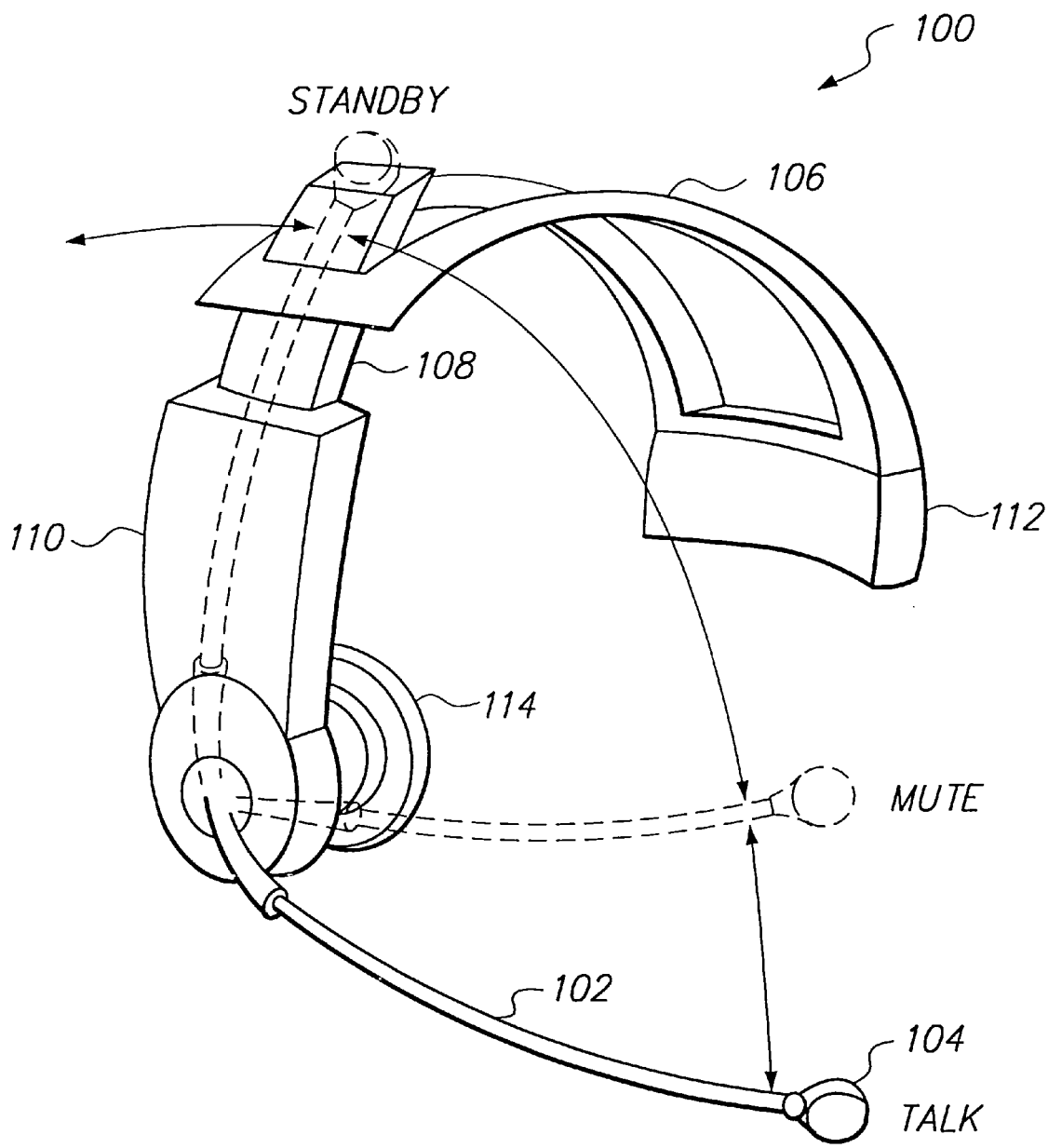
FIG. 1 illustrates a perspective view of a headset according to the present invention having a rotatable microphone boom.

FIG. 1 illustrates a perspective view of a headset 100 according to the present invention having a rotatable microphone boom 102. The microphone boom 102 includes a microphone 104. The headset 100 also includes an arcuate headband 106, an adjustment mechanism 108 for selectively sizing the headband 106, a housing 110 which contains circuitry associated with the headset 100 and mechanical apparatus for rotational attachment of the microphone boom 102, a battery 112 for powering the circuitry contained in the housing 110 and a speaker 114.

Preferably, the headset 100 is a cordless telephone headset. In which case, a wireless communication link is established between the headset 100 and a base unit (not shown). Accordingly, the housing 110 preferably includes a radio transmitter for transmitting signals picked up by the microphone 104 to the base unit and a radio receiver for receiving signals from the base unit and applying them to the speaker 114.

The microphone boom 102 is rotatable with respect to the housing 110 and the headband 106 for controlling an operative condition of the headset 100. When the microphone boom 102 is positioned approximately straight upward with respect to a user's head (e.g. approximately between 11 o'clock and 1 o'clock), the headset 100 is preferably in an "off" or "standby" mode. In this mode, the microphone 104 and speaker 114 are inoperative for communicating voice signals, however, the base unit preferably can notify the user of an incoming call by transmitting a preselected ring signal to the headset 100.

When the microphone boom 102 is positioned at greater angle with respect to the headband 106 (e.g. between approximately 1 and 3 o'clock), the headset is preferably in a "mute" mode. In the mute mode, the user can receive and listen to voice signals from the base unit, though the headset transmitter and/or microphone 104 are conditioned to be inoperative for communication.

When the microphone boom is pointing downward as viewed from the side (e.g. between approximately 4 and 5 o'clock), the headset is preferably in a "talk" mode. In this mode, both the microphone 104 and the speaker 114 are operative for carrying on a two-way conversation. In addition, upon transitioning from the "standby" position to the "talk" position, the headset 100 preferably sends a preselected signal to the base unit which instructs the base unit to go off-hook. In this manner, an incoming telephone call can be answered remotely by the user. Conversely, a transition to the "standby" mode signals the base unit to return to an on-hook condition for remotely terminating a incoming or outgoing telephone call. Such an automatic remote on-hook/off-hook system is disclosed in commonly owned U.S. patent application Ser. No. 08/798,372, filed Feb. 10, 1997 and entitled AUTOMATIC TELEPHONE PICKUP APPARATUS which is incorporated herein by reference.

Figure 2:
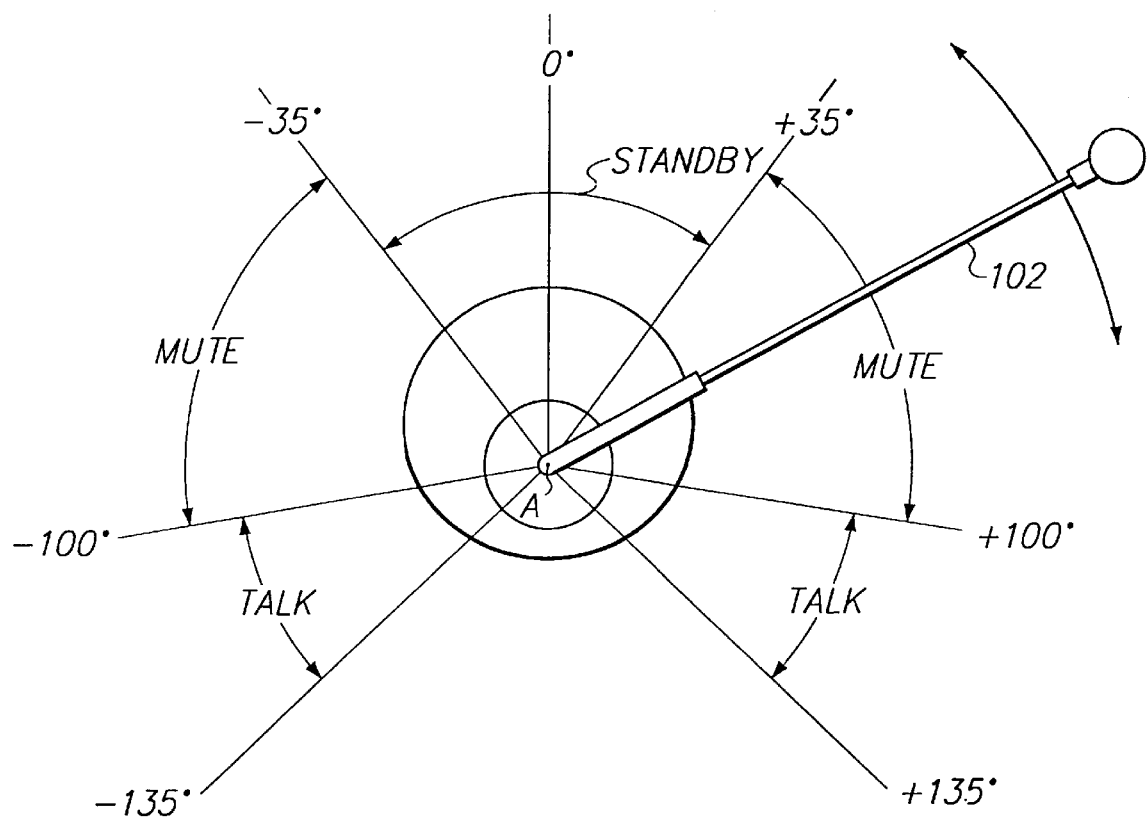
FIG. 2 illustrates a side view of various rotational positions for the microphone boom according to the present invention.

FIG. 2 illustrates a side view of various rotational positions for the microphone boom 102 where the axis of rotation is perpendicular to the page at point A. Preferably, a range of rotational positions corresponds to each operational mode ("standby," "mute," or "talk"). Also, the range of rotational positions of the microphone boom 102 for each mode are located symmetrically about 0 degrees. This symmetry allows the headset 100 to be positioned on the user's head such that the speaker 114 covers either the right ear or the left ear without requiring modification to the headset 100.

The straight up position of the microphone boom 102 as illustrated aligned with the headband in FIG. 1 corresponds to 0 degrees in FIG. 2. The "standby" mode includes the 0 degree position and preferably extends from approximately −35 degrees to approximately +35 degrees. The "mute" mode extends from approximately +35 degrees to approximately +100 degrees. The "mute" mode also extends from approximately −35 degrees to approximately −100 degrees. The "talk" mode extends from approximately +100 degrees to approximately +135 degrees. The "talk" mode also extends from approximately −100 degrees to −135 degrees. Preferably, the microphone boom is mechanically constrained from rotating beyond approximately +135 degrees and −135 degrees as will be explained further below.

Figure 3:
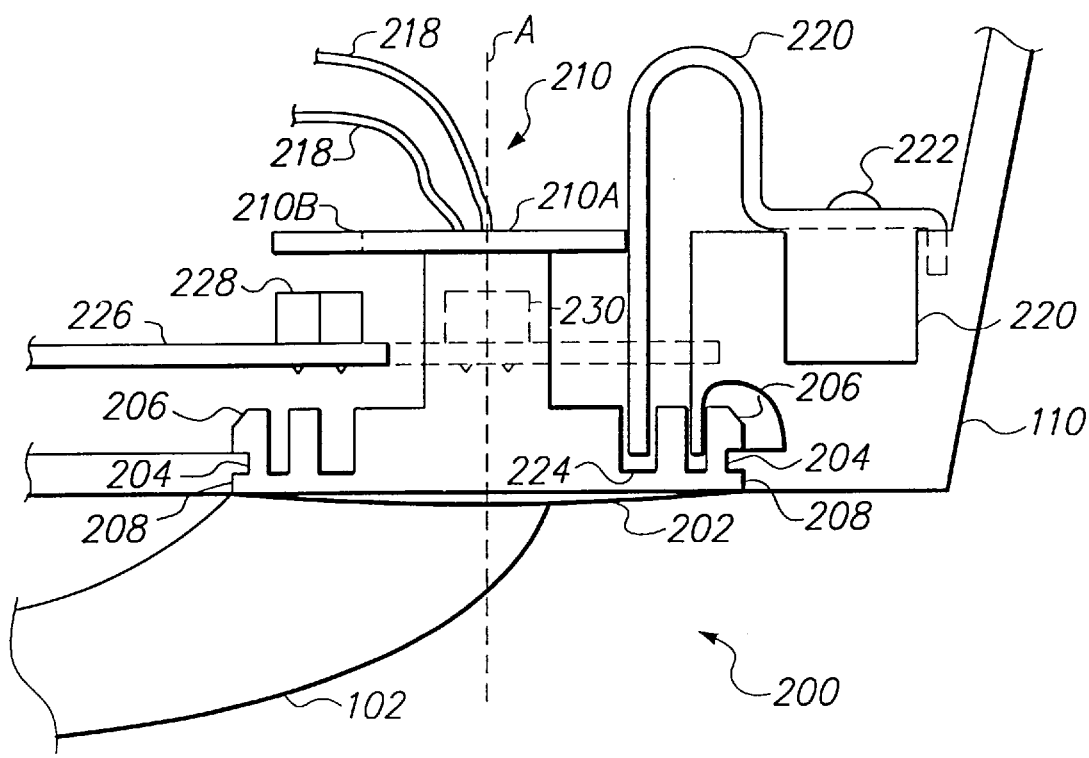
FIG. 3 illustrates a sectional view of the headset according to the present invention.

FIG. 3 illustrates a sectional view of a portion of the headset housing 110 including a mechanical apparatus 200 for rotational attachment of the microphone boom 102. The section bisects the housing 110 along its length and through the rotational axis A. The microphone boom 102 is coupled to a shaft member 202. The housing 110 includes a circular opening bounded by a lip 204 for accepting the shaft member 202. The shaft member 202 includes a resilient circular flange 206 and circular rim 208 for retaining the lip 204 therebetween.

Figure 4:
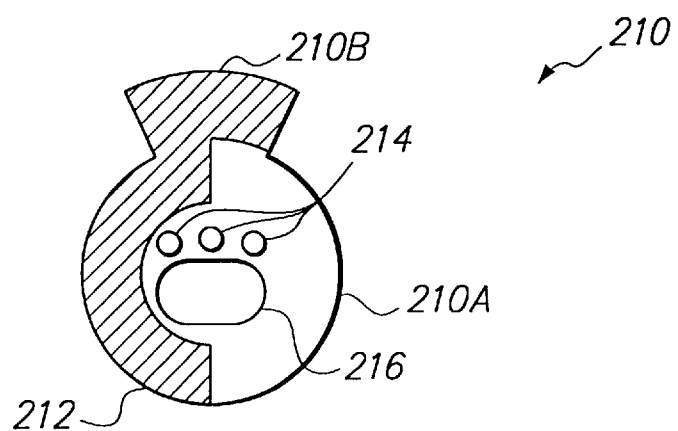
FIG. 4 illustrates a bottom view of the reflective rotator element according to the present invention.

FIG. 4 illustrates a bottom view of a rotator element 210 (FIG. 3) according to the present invention. The rotator element 210 includes a substantially circular portion 210A and a sector-shaped tab 210B extending from the circular portion 210A. The tab 210B and a semi-circular sector of the circular portion 210A which includes approximately one-half of the circular portion 210A, as divided by a diameter which approximately bisects the tab 210B, are conditioned to be more optically reflective than the remaining portions of the rotator element 210. This conditioning is preferably accomplished by applying an optically reflective coating 212 to these selected portions of the rotator element 210. The optically reflective coating 212 can be formed for example of aluminum or solder. Preferably, the rotator element 210 is formed of fiberglass and resin, similarly to a printed circuit board. Three apertures are provided in the rotator element 210 for facilitating attachment of the rotator element 210 to the shaft member 202 (FIG. 3).

Referring to FIG. 3, the rotator element 210 is coupled to the shaft member 202 such that the bottom surface of the rotator element 210 faces the shaft member 202 and such that the rotator element 210 rotates concurrently with the microphone boom 102 and shaft member 202 about the axis A. A fourth aperture 216 (FIG. 4) is provided in the rotator element 210 for passage of a pair of microphone wires 218 from the microphone 104 (FIG. 1).

A resilient pressing member 220 is coupled to the housing 110 and presses against the circular portion 210A of the rotator element 210 for increasing frictional resistance against rotation of the rotator element 210, shaft member 202 and microphone boom 102. This frictional resistance maintains the microphone boom 102 in a desired position during use of the headset 100. In addition, the pressing member 220 prevents the microphone boom 102 from rotating beyond +135 degrees or beyond −135 degrees by contacting the tab 210B (as illustrated in FIGS. 5D and 5E). Tension of the pressing member 220 against the rotator element 210 is preferably maintained by attachment of the pressing member 220 to the housing 110 by a screw 222 and by engaging a circular groove 224 in the shaft element 202.

A printed circuit board (PCB) 226 provides circuitry for the headset 100. The circuitry includes the radio transmitter and receiver discussed above, in addition to a circuit for interfacing the microphone 104 (FIG. 1) to the radio transmitter and for interfacing the receiver to the speaker 114 (FIG. 1). In addition, a pair of optical transceivers 228, 230, each having an optical transmitter and an optical receiver, and associated circuitry are mounted to the PCB 226 near the rotator element 210 for controlling an operational condition of the headset 100 ("standby," "mute," "talk").

The circuitry of the PCB 226 provides a binary indication of whether or not the reflective coating 212 on the bottom of the rotator element 210 is substantially within the field of view of each of the optical transceivers 228, 230. Thus, the amount of light received by the optical transceivers 228, 230 is converted to signals that are compared to predetermined thresholds. The predetermined thresholds are preferably independently adjustable to fine tune the device and to accommodate manufacturing variations. The optical transceivers 228, 230 preferably utilize infrared light. To shield extraneous light from interfering with the optical transceivers 228, 230, the housing 110 preferably encloses the rotator element 210 and optical transceivers 228, 230, as illustrated in FIG. 1.

FIGS. 5A–E illustrate a top views of the rotator element 210 according the present invention in each of several different rotational positions with respect to the optical transceivers 228, 230. For reference, the pressing member 220 and rotational axis A are also illustrated in FIGS. 5A–E. Note that because the optical transceiver 228 is located farther from the rotational axis A of the rotator element 210 than the optical transceiver 230, the reflective coating 212 on the bottom surface of the circular portion 210A of the rotator element 210 is preferably never within the field of view of the optical transceiver 228 for all possible rotational positions of the rotator element 210. Note also, that the optical transceivers 228 and 230 are spaced apart from each other by approximately 90 degrees with respect to the rotational axis A. While this angular spacing is preferred, other angular spacings can also be used to achieve the benefits of the present invention by following the teachings herein.

Figure 5A:
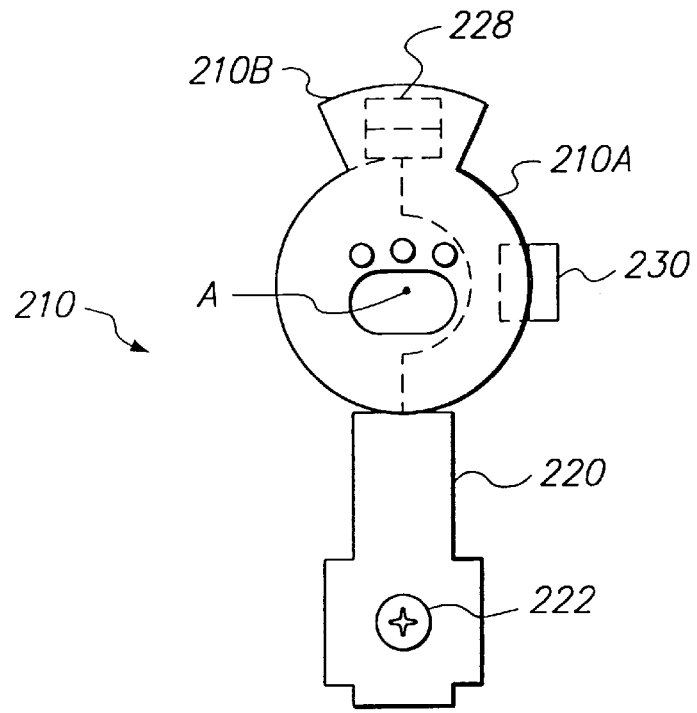
FIGS. 5A–E illustrate a top views of the reflective rotator element according the present invention in each of several different rotational positions.

FIG. 5A illustrates the rotator element 210 in a straight-up position. This position corresponds to the range of angles identified as standby and as shown in FIG. 2. In this position, the reflective coating 212 on the bottom surface of the tab 210B optical transceiver 228 is located substantially within the field of view of the optical transceiver 228 and the reflective coating 212 on the bottom surface of the circular portion 210A of the rotator element 210 is located substantially within the field of view of the optical transceiver 230. In this position, the headset is in the "standby" mode. Note that the rotator element 210 can be rotated in either direction (clockwise or counterclockwise) by a predetermined amount while maintaining a sufficient quantity of the reflective coating 212 within the field of view of the optical transmitters 228, 230 to maintain the headset 100 in the "standby" mode. As illustrated in FIG. 2, the "standby" mode preferably includes a range extending from −35 degrees to +35 degrees. The precise limits of this range, however, are not critical in that variations due to manufacturing tolerances or aging of the headset 100 will not adversely affect its operation.

Figure 5B:
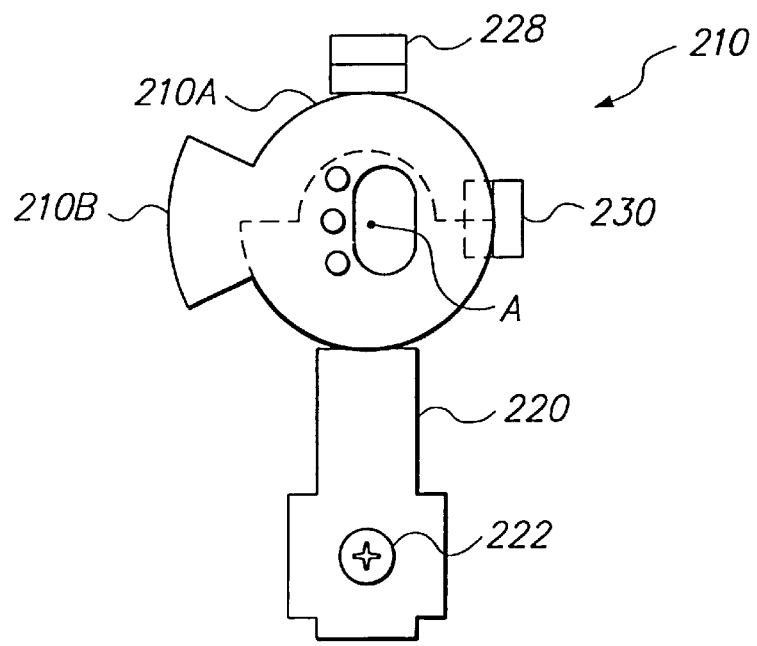
Figure 5C:
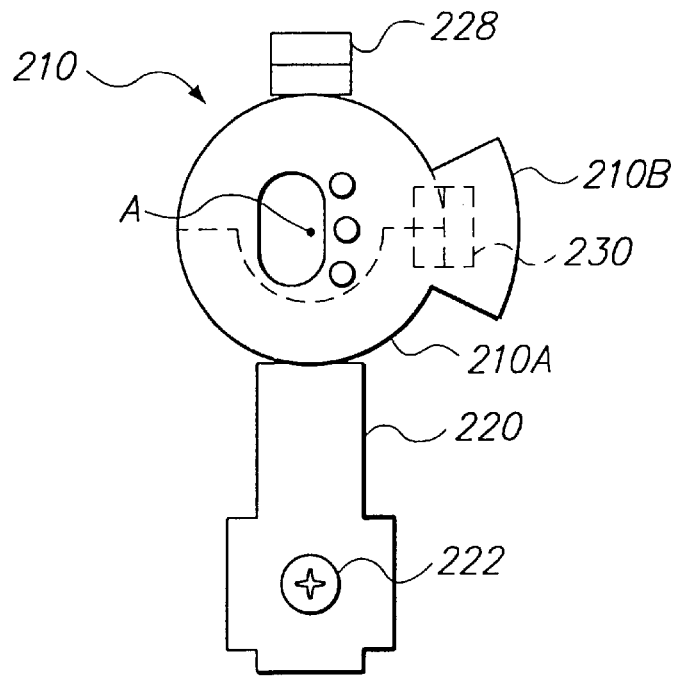
Figure 5D:
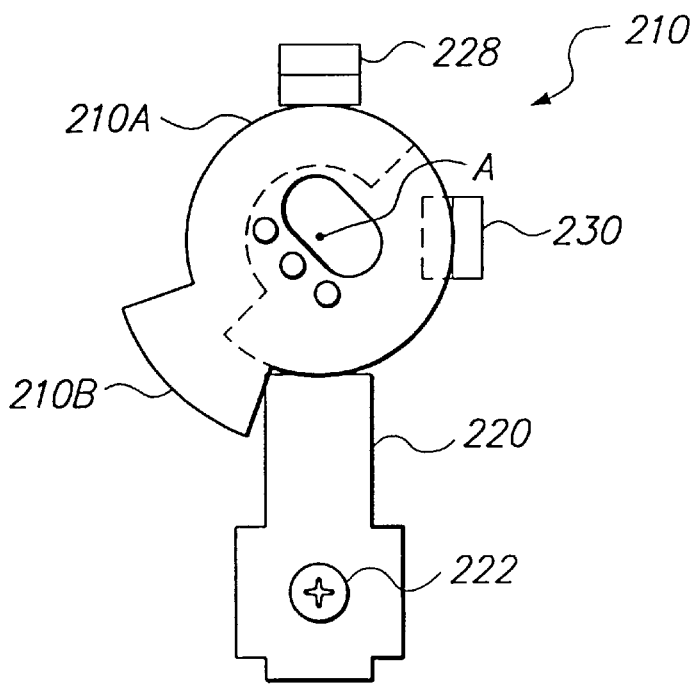
Figure 5E:
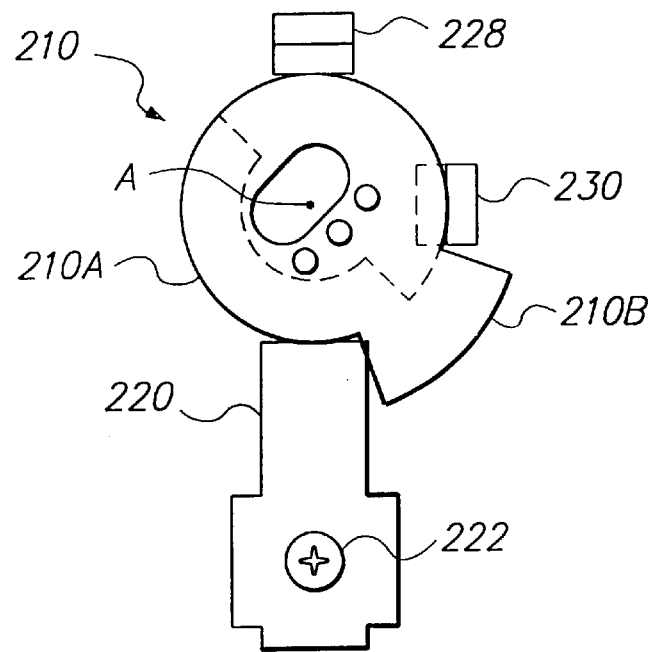

When the microphone boom 102 is rotated such that the reflective coating 212 on the bottom of the tab 210B is substantially outside of the field of view of the optical transceiver 228, while the reflective coating 212 on the bottom of the circular portion 210A of the rotator element 210 remains substantially within the field of view of the optical transceiver 230 regardless of the direction of rotation. When this occurs the headset enters the "mute" mode. This configuration is illustrated in FIGS. 5B and 5C. Note that similar to the "standby" mode, the "mute" mode corresponds to a range of rotational positions of the microphone boom 102. In addition, because there are two positions of the rotator element 210 which correspond to the "mute" mode, as illustrated in FIGS. 5B and 5C, there are two ranges of positions, as illustrated in FIG. 2, for the microphone boom 102 which correspond to the "mute" mode. Again, the precise limits of this range are not critical for operation of the headset 100.

When the microphone boom 102 is rotated even further in either direction of rotation such that the reflective coating 212 on the bottom of the rotator element 210 is substantially outside of the field of view of the optical transceiver 228 and substantially outside the field of view of the optical transceiver 230, headset 100 enters the "talk" mode. This configuration is illustrated in FIGS. 5D and 5E. Note that similar to the "standby" and "mute" modes, the "talk" mode corresponds to a range of rotational positions of the microphone boom 102. In addition, similarly to the "mute" mode, because there are two positions of the rotator element 210 which correspond to the "talk" mode, as illustrated in FIGS. 5D and 5E, there are two ranges of positions, as illustrated in FIG. 2, for the microphone boom 102 which correspond to the "talk" mode. The ranges for the "talk" mode, however, are preferably mechanically constrained by the pressing member 222 limiting the rotation of the rotational element 210 when the tab 210B contacts the pressing member 222, as illustrated in FIGS. 5D and 5E.

Figure 6:
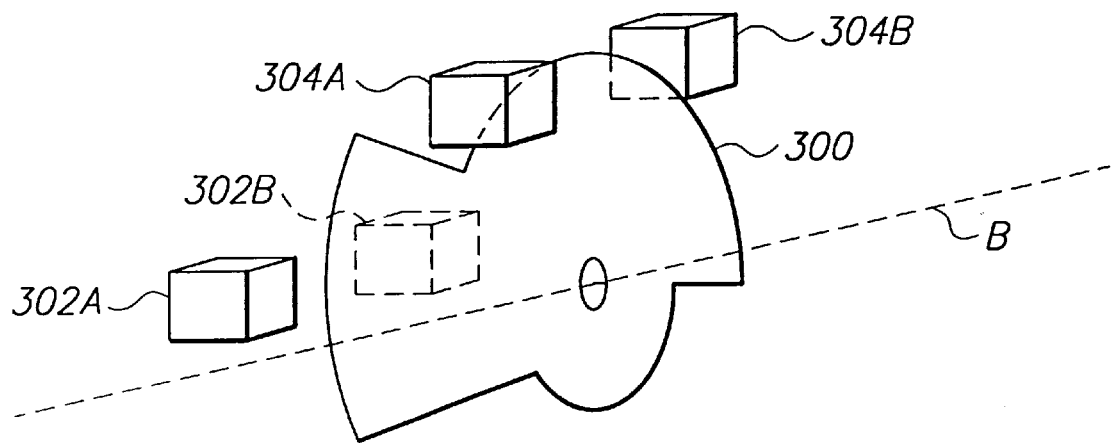
FIG. 6 illustrates perspective view of an alternate embodiment of the rotator element according to the present invention which does not require reflective portions.

FIG. 6 illustrates perspective view of an alternate embodiment of the rotator element according to the present invention which does not require reflective portions. Rather, the rotator element 300 includes sectors having dissimilar radial dimensions about its axis of rotation B and which are formed of a material which is substantially opaque. The rotator element 300 illustrated in is utilized in conjunction with emitter/receiver pairs 302A–B, 304A. Because the elements of each emitter/receiver pair 302A–B, 304B are positioned on opposite sides of the rotator element 300 and because the rotator element 300 includes optically opaque sectors having dissimilar radial dimensions, the rotator element 300 substantially blocks a light path between both, only one, or neither of the emitter/receiver pairs 302A–B, 304A–B depending upon its rotational position with respect to the emitter/receiver pairs 302A–B, 304A–B.

The element 302A can be an emitter, in which case, the element 302B is a receiver, or vice-versa. Similarly, the element 304A can be an emitter, in which case, the element 304B is a receiver, or vice-versa. Thus, when the rotator element 300 is positioned to substantially block the light path between the elements 302A and 302B and also substantially blocks the light path between the elements 304A and 304B, this corresponds to the "standby" mode. When the rotator element 300 is positioned to substantially block the light path between the elements 304A and 304B, but does not block the light path between the elements 302A and 302B, this corresponds to the "mute" mode. Further, when the rotator element 300 is positioned to avoid blocking the light path between the elements 302A and 302B and also avoids blocking the light path between the elements 304A and 304B, this corresponds to the "talk" mode.

Figure 7:
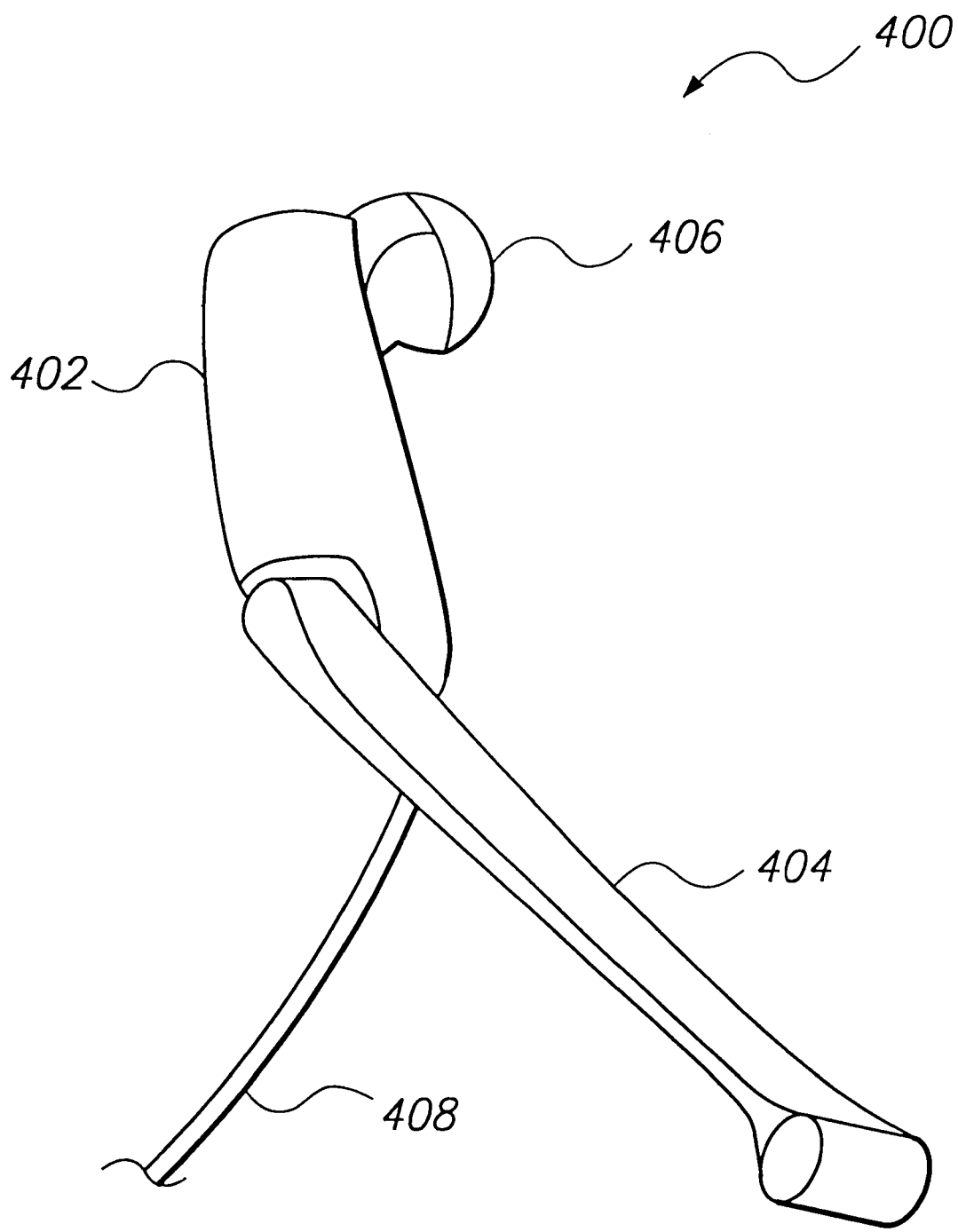
FIG. 7 illustrates perspective view of an alternate embodiment of the headset according to the present invention having a rotatable microphone boom and which does not require a headband.

FIG. 7 illustrates perspective view of an alternate embodiment of the headset 400 according to the present invention having a housing 402 coupled to a rotatable microphone boom 404. The headset 400 illustrated in FIG. 7 differs from the headset 100 illustrated in FIG. 1 primarily in that the headset 400 does not require a headband. Rather, the headset 400 is supported on the head of a user by insertion of an earphone member 406 into the user's outer ear. It will be apparent that other, or additional, means can be provided for supporting the headset 400 on the user. For example a adjustably expandable member can be inserted into the users ear, such as is disclosed in U.S. patent application Ser. No. 08/857,354, entitled, "Intra-Concha Stabilizer With Length Adjustable Chonchal Wall Hook," the contents of which are hereby incorporated by reference, or a clamping member can be provided for clamping to outer portions of the user's ear.

The headset 400 illustrated in FIG. 7 also differs from the headset 100 illustrated in FIG. 1 in that the headset 400 includes a cord 408 for coupling the headset 400 to a telephone base unit (not shown). It will be apparent that the headset 400 (FIG. 7) can be implemented as a cordless headset and that the headset (FIG. 1) can be implemented as a corded headset.

The housing 402 can include a rotator element, such as the rotator element 210 illustrated in FIGS. 3–5 or the rotator element 300 illustrated in FIG. 6, with appropriate circuits and mechanical elements for controlling an operative condition of the headset 400 according to a rotational position of the microphone boom 404 relative the housing 402. More particularly, the headset 400 can be selectively placed in the "standby," "mute" and "talk" modes by rotation of the microphone boom 404 relative the housing 402. It will be apparent that the rotational positions illustrated in FIG. 2 can be utilized for the headset 400.

Alternately, different rotational positions, or ranges of positions, of the microphone boom 404 relative the housing 402 or of the microphone boom 102 relative the housing 110 can be utilized depending upon the circumstances.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to one of ordinary skill in the art that the method of the present invention could be implemented in several different ways and the apparatus disclosed above is only illustrative of the preferred embodiment of the present invention and is in no way a limitation. For example, the axis of rotation for the rotator element need not intersect the area of the rotator element.

What is claimed is:

1. A headset having an optical switch for controlling an operative condition of the headset, the headset comprising:
    a. means for securing the headset to a user;
    b. a microphone boom coupled to the means for securing wherein the microphone boom is rotatable with respect to the means for securing;
    c. a rotator element coupled to the microphone boom wherein the rotator element rotates with respect to the means for securing along with the microphone boom, portions of the rotator element having dissimilar optical properties; and
    d. an optical receiver having a fixed first position relative to the means for securing and having a first field of view, the optical receiver for forming a first binary representation of the optical properties of the portion of the rotator element within the first field of view.

2. The headset according to claim 1 further comprising a second optical receiver in a fixed second position relative to the means for securing and having a second field of view, the second optical receiver for forming a second binary representation of the optical properties of the portion of the rotator element within the second field of view wherein the first and second binary representations determine the operative condition of the headset.

3. The headset according to claim 1 wherein the means for securing the headset to the user is a headband.

4. The headset according to claim 1 wherein an optical emitter is positioned adjacent to the optical receiver and the dissimilar optical properties are reflective and non-reflective.

5. The headset according to claim 1 wherein an optical emitter is positioned opposite the optical receiver and the dissimilar optical properties are opaque and not opaque.

6. A headset having an optical switch for controlling an operative condition of the headset, the headset comprising:
    a. a means for securing the headset to a user;
    b. a microphone boom coupled to the means for securing wherein the microphone boom is rotatable with respect to the means for securing;
    c. a rotator element coupled to the microphone boom wherein the rotator element rotates with respect to the means for securing along with the microphone boom, the rotator element having a first reflective portion; and
    d. a first optical transceiver having a fixed first position relative to the means for securing and having a first field of view, the first optical transceiver for sensing whether or not the first reflective portion is substantially within the first field of view.

7. The headset according to claim 6 wherein the means for securing the headset to the user is a headband.

8. The headset according to claim 6 further comprising a second optical transceiver having a fixed second position relative to the means for securing and having a second field of view.

9. The headset according to claim 6 wherein the rotator element rotates about an axis and includes a substantially planar surface oriented at approximately a right angle with respect to the axis and wherein a first sector of the substantially planar surface includes the first reflective portion.

10. The headset according to claim 9 further comprising a second optical transceiver having a fixed second position relative to the means for securing and having a second field of view.

11. The headset according to claim 10 wherein the first optical transceiver has a first radial distance from the axis and wherein the second optical transceiver has a second radial distance from the axis and further wherein the second radial distance is greater than the first radial distance.

12. The headset according to claim 11 wherein a second sector of the substantially planar surface includes a second reflective portion.

13. The headset according to claim 12 wherein the second reflective portion is positioned outside the field of view of the first optical transceiver at all rotational positions of the rotator element and inside the field of view of the first optical transceiver at selected rotational positions of the rotator element.

14. A headset having an optical switch for controlling an operative condition of the headset, the headset comprising:

a. a means for securing the headset to a user;
b. a microphone boom coupled to the means for securing wherein the microphone boom is rotatable with respect to the means for securing;
c. a rotator element coupled to the microphone boom wherein the rotator element rotates about an axis with respect to the means for securing along with the microphone boom, the rotator element having at least one optically opaque portion; and
d. a first optical path positioned between each element of a first optical emitter/receiver pair wherein the first optical path has a first fixed position relative to the means for securing wherein the first optical path is selectively blocked by the optically opaque portion according to a rotational position of the rotator element.

15. The headset according to claim 14 wherein the means for securing the headset to the user is a headband.

16. The headset according to claim 14 further comprising a second optical path positioned between each element of a second optical emitter/receiver pair and wherein the second optical path has a second fixed position relative to the means for securing.

17. The headset according to claim 16 wherein the first optical path has a first radial distance from the axis and wherein the second optical path has a second radial distance from the axis and further wherein the second radial distance is greater than the first radial distance.

18. The headset according to claim 17 wherein the rotator element has a second optically opaque portion having a dissimilar radial distance from the axis.

19. A headset having an optical switch for controlling an operative condition of the headset, the headset comprising:
a. a means for securing the headset to a user;
b. a microphone boom coupled to the means for securing wherein the microphone boom is rotatable with respect to the means for securing;
c. a rotator element coupled to the microphone boom wherein the rotator element rotates with respect to the means for securing along with the microphone boom, the rotator element having a substantially planar surface wherein selected portions of the surface are conditioned to be more reflective than remaining portions and wherein the rotator element rotates about an axis that is substantially perpendicular to its surface; and
d. a first optical transceiver having a fixed first position relative to the means for securing and having a first field of view, the first optical transceiver for sensing whether or not the selected portions of the surface conditioned to be more reflective are substantially within the first field of view.

20. The headset according to claim 19 wherein the means for securing the headset to the user is a headband.

21. The headset according to claim 19 wherein the surface of the rotator element includes a circular portion having its center located at the axis.

22. The headset according to claim 21 further comprising a second optical transceiver having a fixed second position relative to the means for securing and having a second field of view, the second optical transceiver for sensing whether or not the selected portions of the surface conditioned to be more reflective are substantially within the second field of view.

23. The headset according to claim 22 wherein the surface of the rotator element includes a tab extending from the circular portion.

24. The headset according to claim 23 further comprising a pressing member for increasing frictional resistance against rotation of the microphone boom by pressing against the circular portion and for constraining rotation by contacting the tab.

25. The headset according to claim 23 wherein the tab and a semi-circle of approximately one-half of the circular portion, as divided by a diameter which approximately bisects the tab, are conditioned to be more reflective than the remaining portions of the rotator element.

26. The headset according to claim 22 wherein the first optical transceiver has a first radial distance from the axis and wherein the second optical transceiver has a second radial distance from the axis.

27. The headset according to claim 26 wherein the second radial distance is greater than the first radial distance.

28. The headset according to claim 27 wherein the first optical transceiver and the second optical transceiver are spaced apart from each other by a predetermined number of degrees with respect to the axis.

29. The headset according to claim 28 wherein the predetermined number of degrees is approximately 90 degrees.

30. The headset according to claim 22 wherein the headset is controlled to be in a "standby" condition, a "mute" condition and a "talk" condition according to the rotational position of the rotator element.

31. The headset according to claim 30 wherein in the "standby" condition, the reflective portions of the rotator element are substantially within the field of view of the first optical transceiver and the reflective portions of the rotator element are substantially within the field of view of the second optical transceiver.

32. The headset according to claim 31 wherein in the "mute" condition, the reflective portions of the rotator element are substantially outside the field of view of the first optical transceiver and the reflective portions of the rotator element are substantially within the field of view of the second optical transceiver.

33. The headset according to claim 32 wherein in the "talk" condition, the reflective portions of the rotator element are substantially outside the field of view of the first optical transceiver and the reflective portions of the rotator element are substantially outside the field of view of the second optical transceiver.

34. The headset according to claim 32 wherein rotation of the microphone boom from the "standby" condition in either a clockwise or counterclockwise direction results in a transition to the "mute" condition.

35. The headset according to claim 34 wherein further rotation of the microphone boom from the "mute" condition results in a transition to the "talk" condition.

36. The headset according to claim 35 wherein a transition to the "talk" condition places a telephone base unit off-hook by the headset transmitting a preselected signal to the base unit.

* * * * *